March 31. 1925. 1,531,826
H. H. WIGGLESWORTH
DRYING AND TENTERING MACHINE
Filed June 8, 1923 6 Sheets-Sheet 3
FIG. III
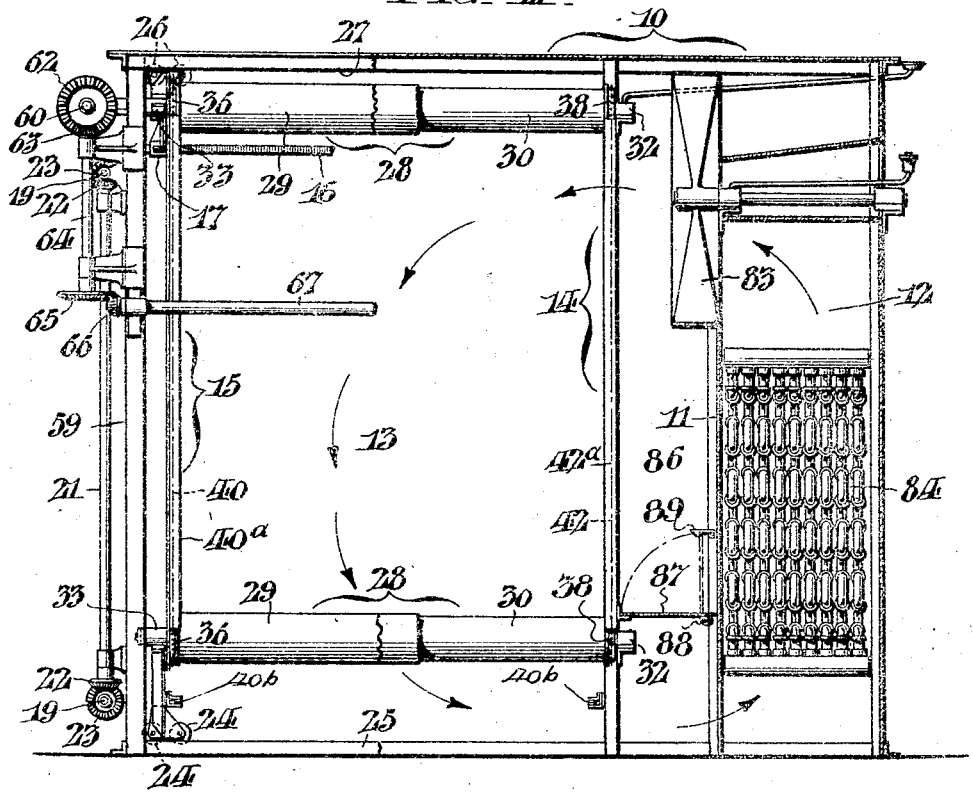
FIG. XIV
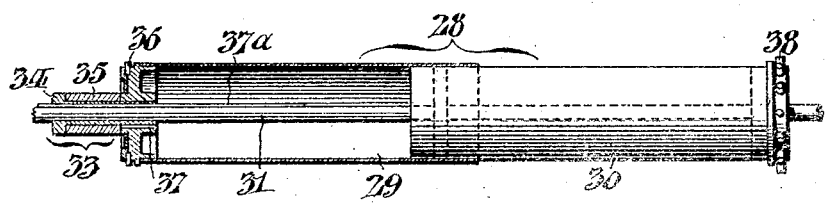
WITNESSES:
John C. Bergner
Alfred E. Ischinger
INVENTOR:
Harry H. Wigglesworth,
BY Harry Paul
ATTORNEYS.

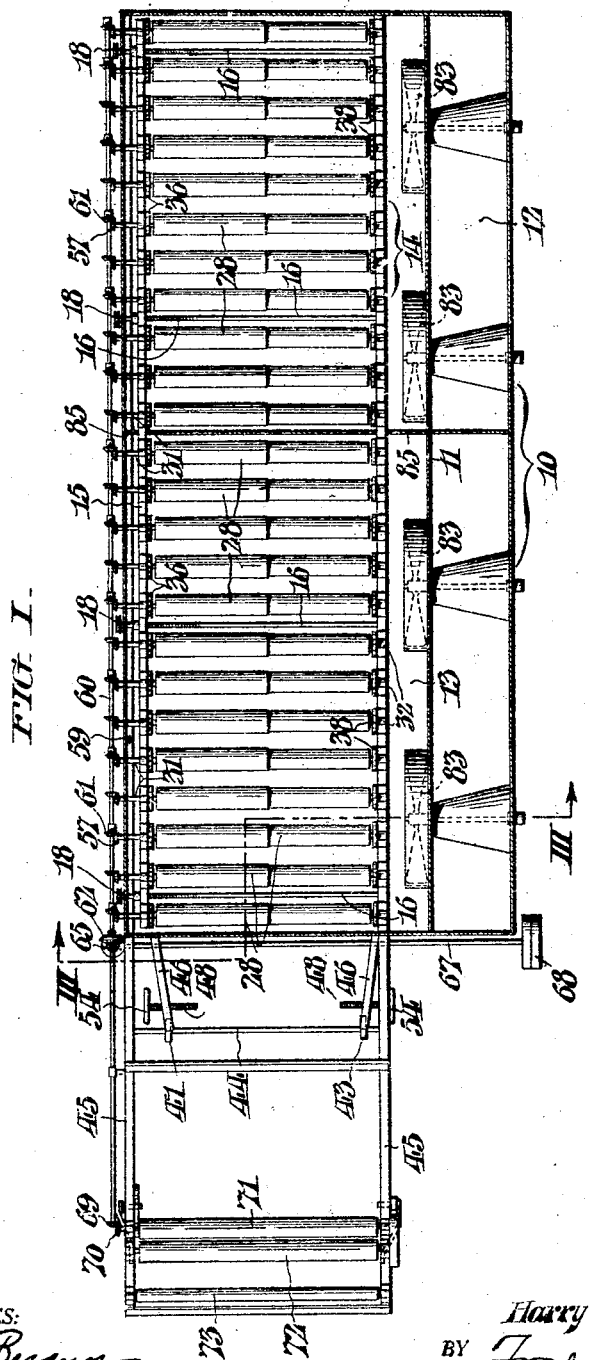

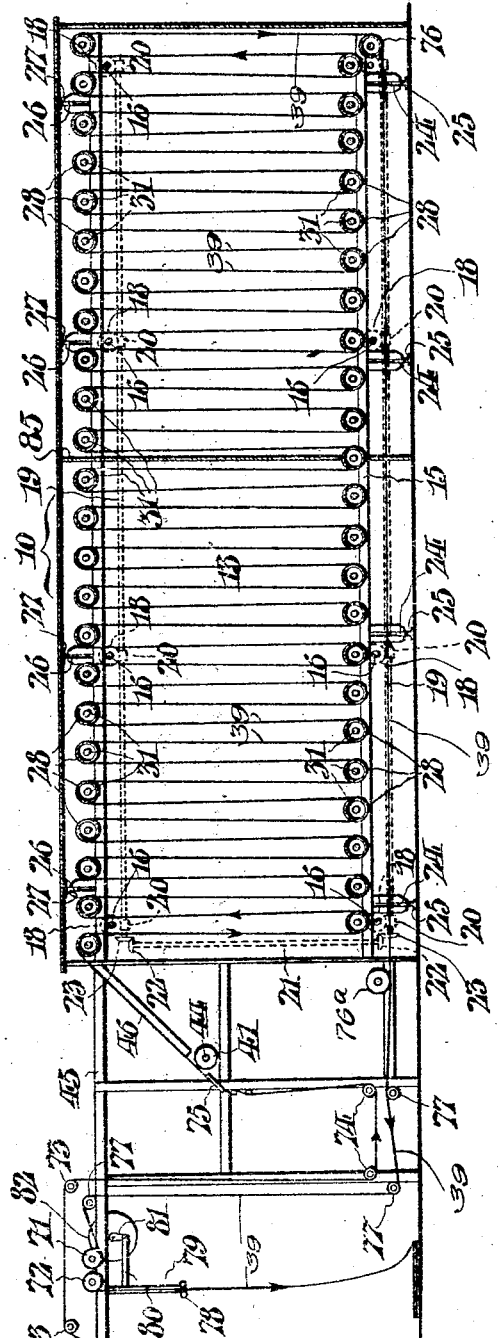

March 31. 1925.                                               1,531,826
H. H. WIGGLESWORTH
DRYING AND TENTERING MACHINE
Filed June 8, 1923                           6 Sheets-Sheet 4
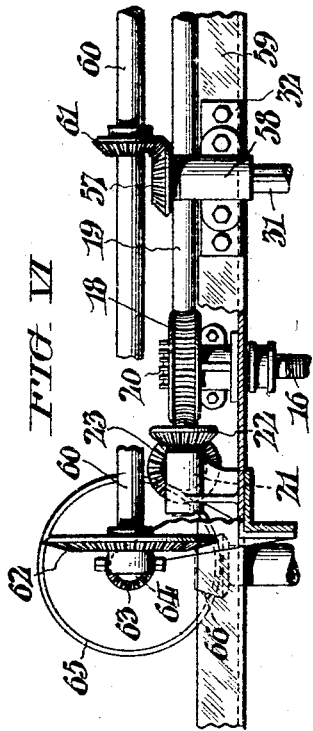
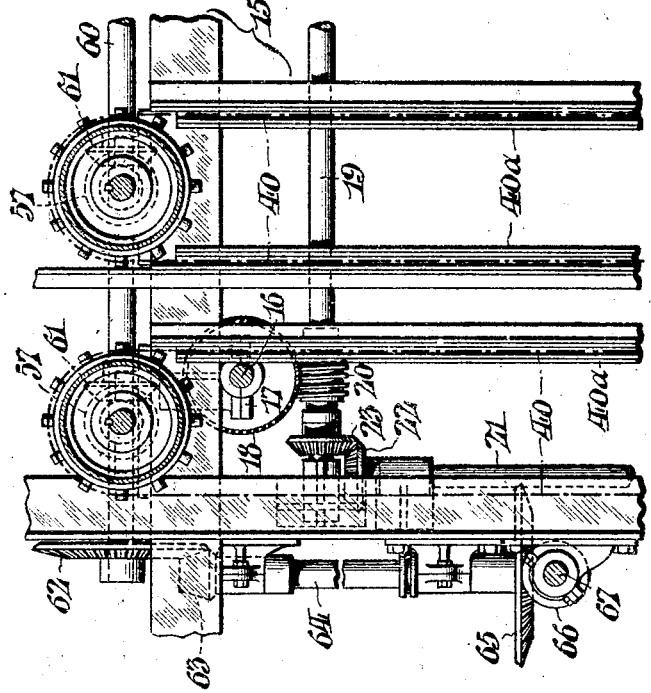
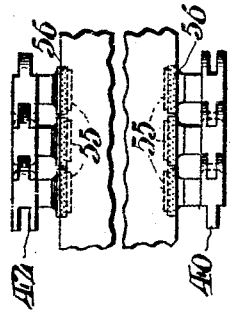
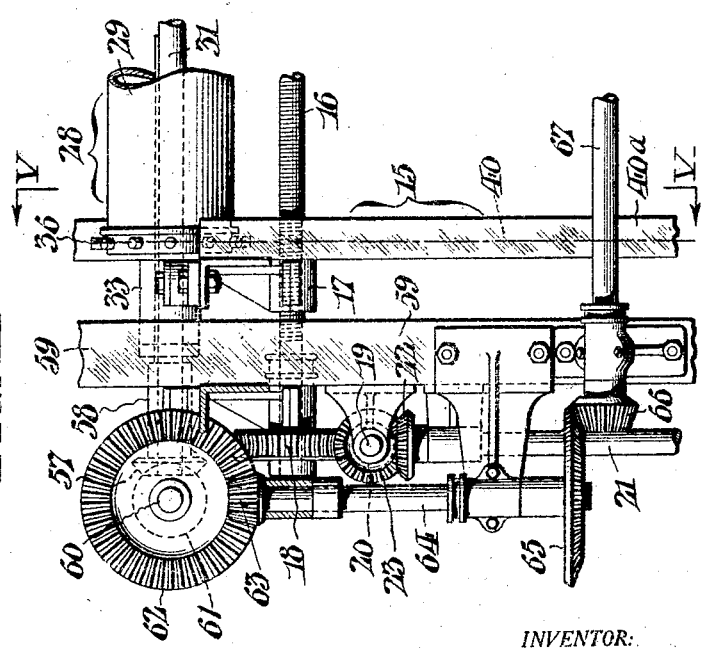
WITNESSES:                                    INVENTOR:
                                              Harry H. Wigglesworth
                                              BY
                                              ATTORNEYS.

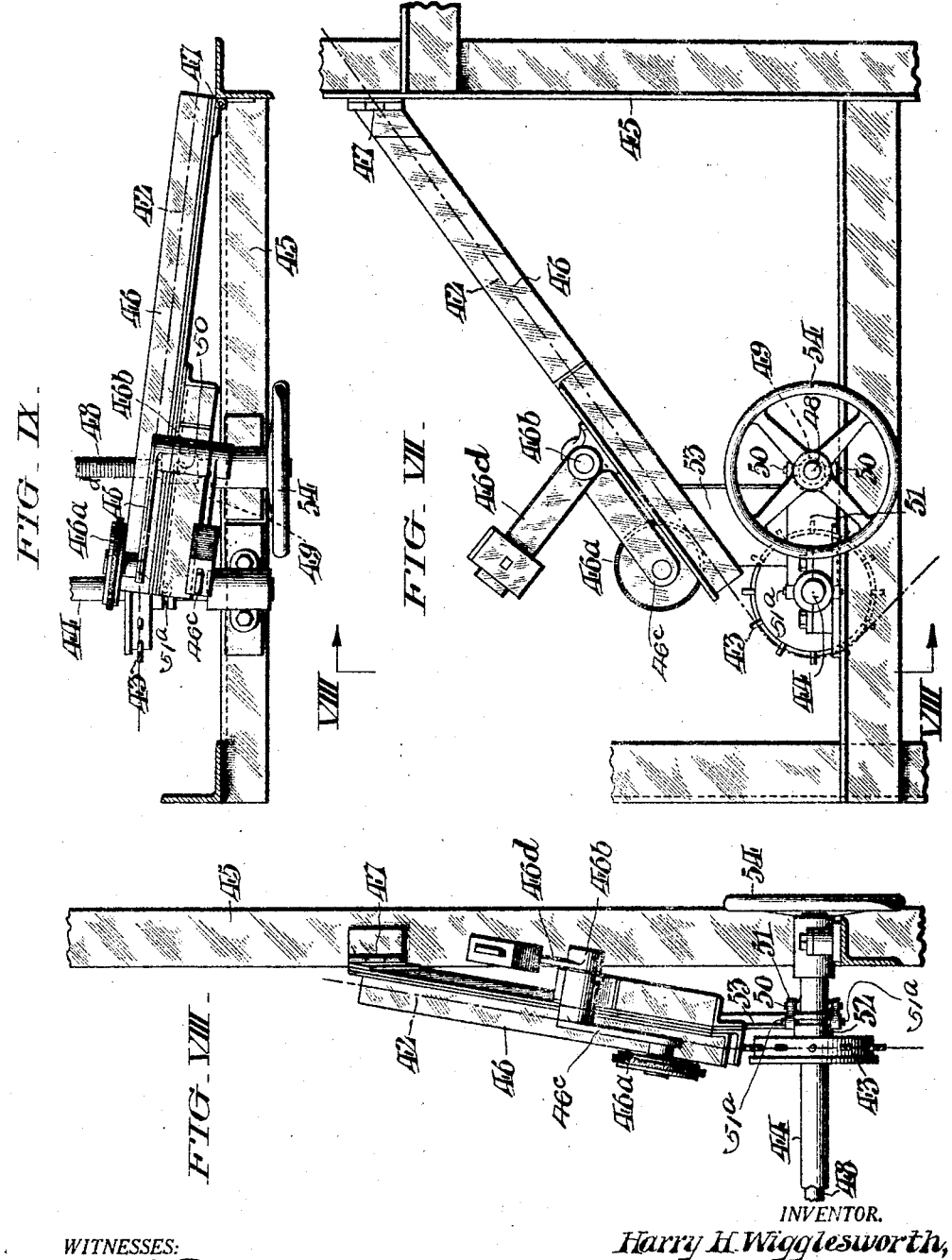

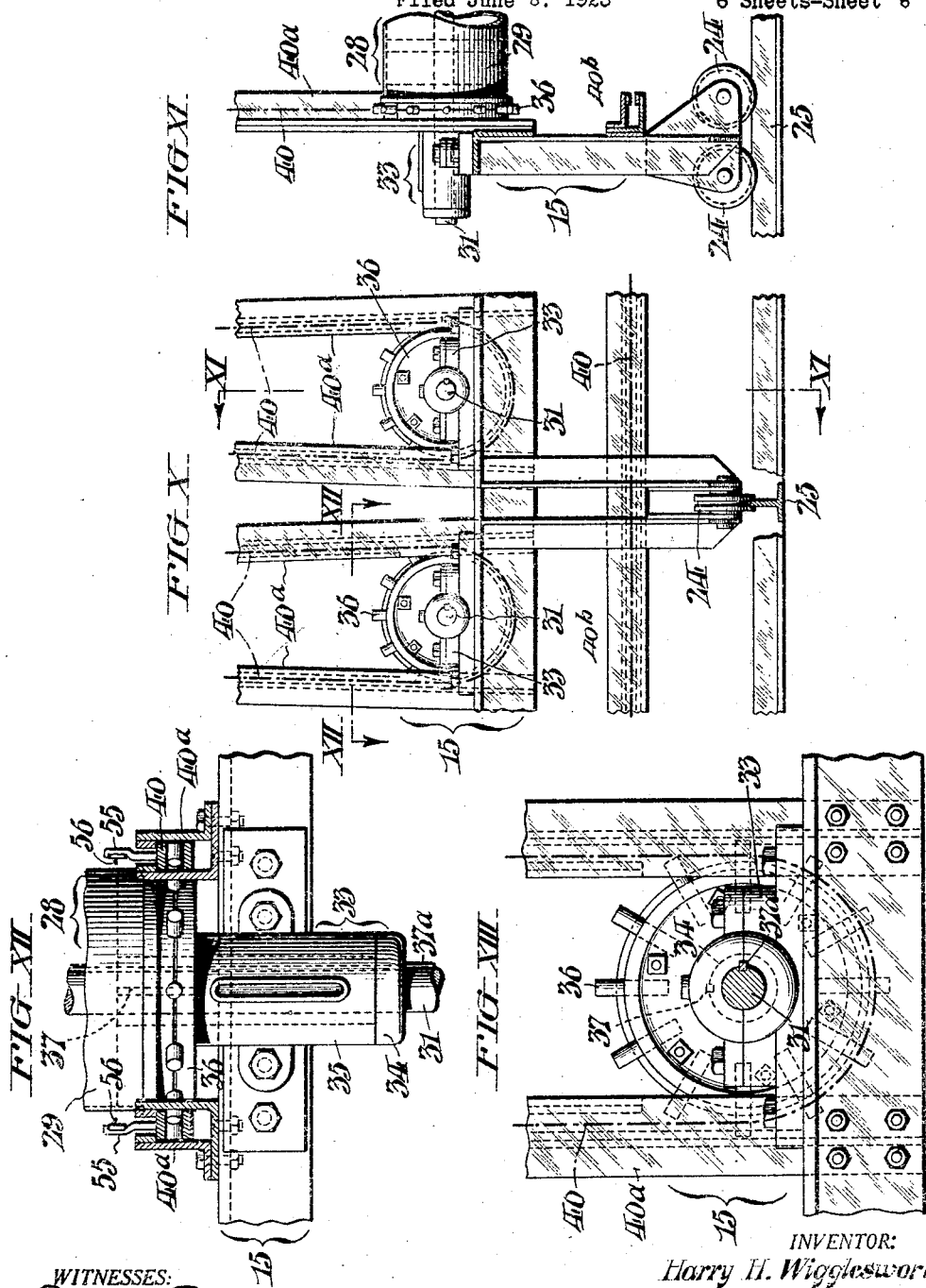

Patented Mar. 31, 1925.

1,531,826

UNITED STATES PATENT OFFICE.

HARRY H. WIGGLESWORTH, OF PHILADELPHIA, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

DRYING AND TENTERING MACHINE.

Application filed June 8, 1923. Serial No. 644,115.

*To all whom it may concern:*

Be it known that I, HARRY H. WIGGLESWORTH, a citizen of the United States, residing at Philadelphia, county of Philadelphia, and State of Pennsylvania, have invented certain new and useful Improvements in Drying and Tentering Machines, whereof the following is a specification, reference being had to the accompanying drawings.

This invention relates to textile machinery and more particularly to drying and tentering machines, with the primary objects in view of generally improving the construction of such machines, to simplify their operation, and to provide for adjustments of the several parts to admit goods of varying widths.

Another object of the invention is to provide a drying and tentering machine which is characterized by the provision of means to progress the goods within an enclosure in a generally horizontal direction, describing a more or less serpentine or undulatory path of vertically disposed convolutions, and means for creating circulation of heated air between the convolutions so as to thoroughly dry the material.

A further object of the invention is to provide a drying and tentering machine of the character stated which includes a novel means for varying the width of the machine and the transverse spacing of the operative elements, to engage the selvage edge of the goods and to stretch the latter transversely during the process of drying, the structure being particularly characterized by the provision of material supporting elements of variable length to conform to the width of material to be treated.

The foregoing and other objects are accomplished by what I now regard as the preferred embodiment of my invention from among other possible forms and arrangements embraced within the spirit of the invention to be hereinafter described, particularly pointed out in the appended claims and illustrated by the accompanying drawings, in which Figure I is a view in top plan of a drying and tentering machine constructed in accordance with the present invention and showing the enclosure in section to disclose interior details.

Fig. II is a view of the machine in longitudinal vertical section, with the chain guides omitted to simplify the illustration.

Fig. III is a view in transverse section taken on the line III—III of Fig. I.

Fig. IV is a detail view on an enlarged scale of the mechanism shown in the upper left hand corner of Fig. III.

Fig. V is a detail view in section taken on the line V—V of Fig. IV.

Fig. VI is a view in top plan of the mechanism shown in Fig. V.

Fig. VII is a detail view in elevation on an enlarged scale of the chain guiding mechanism located at the forward end of the machine.

Fig. VIII is a view in vertical section taken on the line VIII—VIII of Fig. VII.

Fig. IX is a view of the same in top plan.

Fig. X is a fragmentary view, in side elevation, illustrating, on an enlarged scale, the supporting structure for the tentering frame whereby the latter is mounted for lateral rolling movement for the purpose of adjustment.

Fig. XI is a detail view in vertical section taken on the line XI—XI of Fig. X.

Fig. XII is a detail view in enlarged horizontal section taken on the line XII—XII of Fig. X.

Fig. XIII is a detail view in side elevation of the parts shown in Fig. XII.

Fig. XIV is a detail view in side elevation, partly in section, of one of the tentering rolls; and Fig. XV is a detail view in plan of a fragment of the material gripping mechanism.

With reference to Figs. I, II and III showing main assembly views of the machine, 10 indicates generally a rectangular enclosure which is divided through the medium of a longitudinally extending partition wall 11 disposed closely adjacent one side wall of the enclosure to define a relatively narrow heating compartment 12 and a wider treating compartment 13. Located within the treating compartment is a stationary frame indicated generally at 14, and a complementary movable frame 15 adapted for transverse adjustment toward and away from the frame 14. The adjustment just referred to may be effected by any suitable means such as a series of transversely extending threaded shafts 16, each having one end journalled for rotation upon the frame 14 and the opposite end threadedly engaged in a supporting bracket 17 which in turn is supported upon the frame 15, so that the latter may be shifted transversely upon rotation in unison of all of the threaded shafts. The threaded shafts 16 may be rotated through the medium of a system of cooperative gears and transmitting shafts consisting of a worm wheel 18 fixed to the end of each shaft 16, and a pair of horizontal shafts 19, 19 in vertically spaced relation located adjacent the upper and lower portions of the movable frame 15 and which are supplied with worm gears 20, 20 for respective meshing engagement with the wheels 18, 18. Synchronous rotation of the horizontal shafts 19 is brought about by means of a vertical shaft 21 having a beveled gear 22 at each end the latter in turn meshing respectively with beveled gears 23, fixed upon the shafts 19.

By rotating the shaft 21 its motion is imparted to the threaded shafts 16 and distributed so as to cause uniform shifting of the movable frame 15 without binding.

The movable frame 15 is supported through the medium of rollers 24 which are provided in pairs at the lower end of said frame at suitably spaced intervals and which are adapted to ride upon transverse tracks 25. For the purpose of steadying movement of the movable frame 15 a second series of roller groups may be provided at the upper portion thereof each indicated at 26 to engage guiding tracks 27 extending transversely of the enclosure and secured to the roof plate.

The tentering rolls, indicated generally at 28 and shown in detail in Fig. XIV are extended transversely of the machine and supported upon and between the stationary and movable frames 14 and 15 respectively. Each tentering roll 28 consists of a pair of telescopic sections 29 and 30 for relative movement to vary the effective length of said roll. Each tentering roll 28 is supported upon the frame 14 through the medium of a shaft 31, which extends axially through the sections of said roll, and is supported by means of a bearing bracket 32 of conventional form, while the opposite end of the shaft 31 is supported upon the movable frame 15 through the medium of a specific form of bearing bracket indicated generally at 33 in Fig. XII. This specific form of bearing bracket 33 comprises a bushing 34 in which the shaft 31 is received and a bearing block 35 enclosing said bushing. In this manner all of the tentering rolls 28 are extended or shortened in unison by lateral adjustment of the movable frame 15, the sections 29 sliding over the sections 30 in a manner which will be obvious upon the examination of Fig. XIV. Each shaft 31 is provided at its adjustably supported end with a sprocket wheel 36 which is fixed relative to said shaft by reason of its mounting upon an extension of the bushing 34, a key connection 37 being established between said bushing and sprocket wheel. The shaft 31 in turn is fixed to the bushing 34 through the medium of a spline and keyway arrangement 37$^a$ so as to ensure fixed relation between the roll sections 29, 30. The nonadjustable end of each shaft 31 is likewise provided with a sprocket wheel 38 in fixed engagement therewith. The sprocket wheels 36, 38 are preferably of multipartite construction including removable radial pins which constitute the sprocket teeth.

It will be noted from an examination of Fig. II that the upper tentering rolls 28 are displaced laterally relative to the lower rolls 28 so as to be out of vertical alignment, thereby permitting the material 39 to be trained around the two sets of rolls to describe an undulatory path, forming vertical stretches which may be perpendicular or inclined to the vertical as desired.

The sprocket wheels 36 of both sets of tentering rolls 28 are connected by means of an endless chain 40 which follows the direction of the material 39 with a portion of its length extended beyond the front end of the machine and guided over a sprocket wheel 41. In a similar manner the sprockets 38, 38 are connected by means of an endless chain 42 following the path of the material 39 and having a portion of its length extended beyond the forward end of the machine and trained around a sprocket wheel 43 Figs. I, VII, VIII and IX. The endless chains 40 and 42 are each guided within vertical channel members 40$^a$ and 42$^a$ respectively, the latter having overhanging flanges to enclose said chains and prevent withdrawal from the guides under the tension of the material while drying, similar channel guides 40$^b$, Figs. X and XI being arranged horizontally to carry the lower return stretches of the chains to the front of the machine. The sprocket wheels 41 and 43 are mounted in fixed engagement upon a transverse shaft 44 in turn journalled upon a frame 45 and located at a point somewhat below the upper series of tentering rolls 28. The chain stretches between the sprockets 41 and 43 and the foremost tentering roll 28 of the upper series are each guided within inclined channel bars 46 of which a pair are provided, one at each side of the machine and each having its upper end mounted for lateral swinging movement through the medium of a hinge joint 47. The inclined bars 46 as well as the sprocket-wheels 41 and 43 are independently movable toward and away from each other by means of aligned transverse screws 48 having their adjacent ends oppositely threaded and each supporting a nut 49 traversable thereon. Each nut 49 is provided with oppositely extending pins 50 which are held in pivotal relation within the forked end of a block 51, the opposite end of the latter being forked and provided with pins 51$^a$ loosely entering grooved hubs 52 of the sprockets 41 and 43. Each block 51 is further provided with an upward extension 53 having a rigid connection with its respective inclined arm 46. A hand wheel 54 is provided at the outer end of each screw 48 for convenient manipulation from either side of the machine to effect lateral adjustment of the arms 46 and sprockets 41 and 43 toward, and away from, each other for a purpose to be presently noted.

Each chain 40 and 42 is provided with a series of laterally extending fingers 55 having pin-pads 56 as shown in Fig. XV for the purpose of engaging and securing the selvage edges of the goods. Each arm 46 carries a circular brush 46$^a$ mounted for vertical oscillation upon a shaft 46$^b$ through the medium of a supporting arm 46$^c$. A weighted arm 46$^d$ forming part of the arrangement is adapted to urge the brush 46$^a$ in engagement with the selvage edge of the material 39 to insure the fixation thereof to the pins 56.

Rotation of the tentering rolls 28 must be effected in unison and the result is accomplished in the present instance by the provision of bevel gears 57 one of which is provided upon each shaft 31 in fixed engagement therewith, the ends of said shafts being extended and journalled in bearing brackets 58 carried upon a frame 59 forming a reinforcing structure for the enclosure 10. A horizontal shaft 60 is extended along the upper portion of the frame 59 and is provided at intervals with a bevel gear 61 each having meshing engagement with its respective bevel gear 57. A miter gear 62 is fixed to one end of the shaft 60 for meshing engagement with a miter gear 63 in turn mounted upon the upper end of a vertical shaft 64 having a miter gear 65 fixed to its lower end for meshing engagement with a miter gear 66 in turn fixed to one end of a transverse power shaft 67, the opposite end of the latter having a pulley couple 68 Fig. I for the application of power.

The shaft 60 is extended forwardly to the end of the aforesaid frame 45 and is provided with a bevel gear 69 Fig. I in meshing engagement with a bevel gear 70 fixed to a shaft which supports a guide roller 71 for cooperation with a companion roller 72 between which rollers the material 39 is drawn.

In operation, the material 39 is guided above the frame 45 over rollers 73, as best seen by Fig. II then directed downward beneath rollers 74 located at the lower portion of the frame and then upward and through guiding means 75 to a point where its selvage edges are disposed adjacent the sprockets 41 and 43 around which the chains 40 and 42 are guided. At this point the selvage edges of the material 39 are engaged upon the pin-pads 56 carried by the extensions 55 of the chains 40, 42 and during movement of the latter said material is stretched transversely by reason of the diverging path of the chain stretches at points between the sprockets 41 and 43, and the sprockets 36, 38 of the foremost upper tentering roll 28. The distance between the sprockets 41 and 43 should be such as to cause a gradual stretching of the material 39 without tearing, eventually extending the same to its normal or intended width, the movable frame 15 being adjusted accordingly to insure the tentering of the goods to the desired width. Rotation of the tentering rolls 28 in the manner described causes a progressive movement of the material 39 in an undulatory path from the forward end to the rear end of the machine, as best appreciated on an examination of Figure II, said material thereafter passing around a lower guide roll 76 forwardly again between the frames 14 and 15 and under a second guide roller 76$^a$, beyond the forward end of the treating enclosure 13, then upwardly over and under a series of guiding rollers 77, and thence between the aforesaid rollers 71 and 72. If desired the material 39 as it passes from the rollers 71, 72 may be folded by any means found suitable or convenient, as for instance by passage between guiding rollers 78 carried by depending arms 79, the latter being slowly oscillated by means of a pitman connection 80 to a crank arm 81 in turn rotated by a gear 82 which may be conveniently driven from the roller 71.

Drying of the material is accomplished by the circulation of heated air brought about in any suitable manner as by means of fans 83 Figs. I and III of which a series are provided and located in openings formed in the partition 11, the latter terminating at a point spaced from the bottom of the enclosure to provide a circulatory path upward through the heating chamber 12, through the fan opening and downward through the treating or drying chamber 13 and beneath said partition. The heating chamber 12 is provided with one or more banks of heating coils 84 and if desired said chamber and the chamber 13 may be sub-divided by means of a transverse partition 85 defining separate compartments through which the material is successively carried. By varying the temperatures in the two sub-divisions or by otherwise varying conditions therein a different form of treatment can be given in each compartment for the purpose of effecting specific results, for example, one of such divisions may be employed as the drying chamber, while the other may be assigned to conditioning the material after drying, by maintenance of a humidified atmosphere therein as is well known to those skilled in the art to which this invention pertains. The partition 85, as will be particularly noted from Figs. I and II, extends across the entire enclosure 10 only enough clearance or opening being allowed therein for accommodation of one of the tentering rolls 28 of the lower set and the passage of the material 39 thereabout.

Attention is also directed to the fact that sufficient space 86 exists (see Fig. III) between the partition 11 and the frame 14 to afford a thorofare permitting an operative to walk in a longitudinal direction through the machine for purposes of inspection, adjustment or oiling of the moving parts as occasion may require. In order to prevent short circuiting of the air by virtue of the existence of the space 86, I have made provisions toward offsetting such contingency by interposing therein, at a point near the bottom thereof, a baffle 87 which is preferably hinged as at 88 so that it may be swung up and out of the way when necessary as indicated in dotted lines, and there temporarily held by a keeper in the form of a hook 89 designed for this purpose.

Having thus described my invention, I claim:

1. A machine of the character described, comprising an enclosure subdivided by longitudinal partitions into drying and heating compartments with an intermediate thorofare, means to progress material of different widths through the drying compartment in a horizontal direction along a path composed of vertical undulations, and means for tentering the material on the progressing means while drying.

2. A machine of the character described, comprising an enclosure subdivided by longitudinal partitions into drying and heating compartments with an intermediate thorofare, a frame contained in the drying compartment composed of laterally adjustable sections, and extensible means carried between the frame sections to progress and tenter the material through the enclosure and adapted to accommodate material of different widths.

3. A machine, of the character described, comprising an enclosure subdivided by longitudinal partitions into drying and heating compartments with an intermediate thorofare, a frame contained in the drying compartment composed of a fixed and a movable section, telescopic tentering and progressing elements supported between the frame sections, and means for moving the movable frame section to accommodate material of different widths.

4. A machine, of the character described, comprising an enclosure subdivided by longitudinal partitions into drying and heating compartments with an intermediate thorofare, a frame contained in the drying compartment composed of a fixed and a movable section, progressing rolls carried between the frame comprising telescoping sections to vary the effective length of said rolls, and means to move the movable frame and telescopic rolls to accommodate material of different widths.

5. A machine, of the character described, comprising an enclosure subdivided by longitudinal partitions into drying and heating compartments with an intermediate thorofare, a frame composed of laterally adjustable sections contained in the drying chamber, telescoping rolls carried between the frame sections and arranged to progress the material horizontally along a vertically undulating path, means for adjusting the frame sections to accommodate material of varying widths, means to rotate the rolls in unison, and means to tenter the material during progression.

6. A machine, of the character described, comprising an enclosure subdivided by longitudinal partitions into drying and heating compartments with an intermediate thorofare, vertically spaced rollers in the drying chamber for progressing the material horizontally along an undulatory path, endless elements traversing a path coinciding with the path of travel of the material, and means carried by said endless elements to engage and tenter the material.

7. A machine, of the character described, comprising an enclosure subdivided by longitudinal partitions into drying and heating compartments with an intermediate thorofare, vertically spaced rolls in the drying chamber over which the material is trained to progress the same horizontally over an undulatory path, sprockets carried by the rolls, chains trained around the sprockets following the trend of the material, means carried by the chains to engage and tenter the material, and means to rotate the rolls in unison.

8. A machine, of the character described, comprising an enclosure subdivided by longitudinal partitions into drying and heating compartments with an intermediate thorofare, means to progress material through the drying compartment, a pair of independently adjustable means to engage the edges of the material to stretch the same to desired width, and means cooperative with the progressing means to tenter the material while drying.

9. A machine of the character described comprising an enclosure subdivided to afford a drying compartment, a heating compartment, and a thorofare intermediate said drying and heating compartments, means for circulating air between the drying and heating compartments, and means for preventing short circuiting of the air through the thorofare aforesaid.

10. A machine of the character described comprising an enclosure subdivided longitudinally into a drying compartment, a heating compartment, and a thorofare intermediate the drying and heating compartments, means for circulating air laterally between the drying and heating compartments, and means for preventing short circuiting of the air through the thorofare aforesaid.

11. A machine of the character described, comprising an enclosure subdivided by a partition into a drying compartment and a heating compartment, means for circulating air between the drying and heating compartments by way of openings at the top and bottom of the partition, a conveyor supporting frame within the drying compartment in proximate parallelism to the partition but with interposition of a thorofare, and means for preventing short circuiting of the air through the thorofare aforesaid.

12. A machine of the character described, comprising an enclosure subdivided by a longitudinal partition into a drying compartment and a heating compartment, means for circulating air laterally of the enclosure between the drying and heating compartments by way of openings at the top and bottom of the partition, a conveyor supporting frame within the drying compartment in proximate parallelism with the partition but with interposition of a longitudinal thorofare, and means for preventing short circuiting of the air through the thorofare aforesaid.

13. A machine of the character described, comprising an enclosure subdivided by a partition into a drying compartment and a heating compartment, means for circulating air between the drying and heating compartments by way of openings at the top and bottom of the partition, a conveyor supporting frame within the drying compartment in proximate parallelism to the partition but with interposition of a thorofare, and a baffle crosswise of said thorofare preventing short circuit of the air therethrough, said baffle being hingedly mounted so that it may be swung out of the way to permit passage of an operative through said thorofare.

14. A machine of the character described, comprising an enclosure subdivided by a partition into a drying compartment and a heating compartment, means for circulating air between the drying and heating compartments by way of openings at the top and bottom of the partition, a conveyor supporting frame within the drying compartment in approximate parallelism to the partition but with interposition of a thorofare, and a movable diaphragm crosswise of said thorofare immediately above the bottom opening of the partition for preventing short circuit of the air through said thorofare.

15. A machine, of the character described, comprising an enclosure subdivided by longitudinal partitions to afford treating and heating compartments with an intermediate thorofare, and a number of transverse partitions, with openings merely large enough to allow passage of the material being treated, subdividing the treating compartment into a succession of sections permitting maintenance of different atmospheric conditions within the enclosure and, accordingly different actions to be performed upon the material as it is successively passed through the subdivisions.

16. A machine, of the character described, comprising an enclosure subdivided by longitudinal partitions to afford a treating compartment and a heating compartment extending in parallel relation with an intervening thorofare, and partitions extending crosswise of the machine and subdividing both the treating compartment and the heating compartment into a number of sections permitting maintenance of different atmospheric conditions within the enclosure and, accordingly, different actions to be performed upon the material being treated as it passes successively through the sections of the subdivisions in the treating compartment.

17. A machine, of the character described, including paralleled and successive heating and treating compartments with an intermediate thorofare, means to progress material through the successive treating compartments, means for tentering the material while under treatment, and means permitting variation of the tentering means to accommodate material of different widths.

18. A machine, of the character described, including paralleled and successive heating and treating compartments with an intermediate thorofare, means to progress material through the successive treating compartments over an undulatory path, means for tentering the material while under treatment, means permitting variation of the tentering means to accommodate material of different widths, and means effecting transverse circulation of heat relative to the travel of the material through the machine.

19. A machine, of the character described, including paralleled and successive heating and treating compartments with an intermediate thorofare, means to progress material through the treating compartment, means for effecting a preliminary gradual stretching of the material prior to entering the treating compartments, means for tentering the material while under treatment, and means permitting variation of the tentering means to accommodate material of different widths.

20. A machine, of the character described, including paralleled and successive heating and treating compartments with an intermediate thorofare, means for effecting a preliminary stretching of the material prior to entering the treating compartments, means for tentering the material while under treatment, and means for adjusting the tentering means to accommodate material of different widths.

21. A machine, of the character described, including paralleled heating and treating compartments with an intermediate thorofare, means to progress material through the successive treating compartments, means for gradually stretching the material prior to entering the machine, means for tentering the material during progression through the machine, means permitting adjustment of the tentering means to accommodate material of different widths, and means effective to prevent short-circuiting of air circulation through the thorofare aforesaid.

22. A machine, of the character described, including paralleled and successive heating and treating compartments with an intermediate thorofare, means to progress material through the successive treating compartments, means for gradually stretching the material prior to entering the machine, means for tentering the material during progression through the machine, means affording adjustment of the tentering means to accommodate material of different widths, means effective to prevent short-circuiting of air through the thorofare, and the aforesaid treating and heating compartments being equipped to effect drying, conditioning and other specific changes in the material.

In testimony whereof, I have hereunto signed my name at Philadelphia, Pennsylvania, this 6th day of June, 1923.

HARRY H. WIGGLESWORTH.

Witnesses:
JAMES H. BELL,
E. L. FULLERTON.